United States Patent
Takakuwa et al.

(10) Patent No.: US 6,280,661 B1
(45) Date of Patent: Aug. 28, 2001

(54) APPARATUS AND PROCESS FOR PRODUCING OPTICAL RECORDING MEDIUM

(75) Inventors: Atsushi Takakuwa, Shiojiri; Takao Nishikawa, Shiojrishi, both of (JP); Satoshi Nebashi, Cambridge (GB)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/297,240

(22) PCT Filed: Aug. 21, 1998

(86) PCT No.: PCT/JP98/03723

§ 371 Date: Jun. 24, 1999

§ 102(e) Date: Jun. 24, 1999

(87) PCT Pub. No.: WO99/10153

PCT Pub. Date: Mar. 4, 1999

(30) Foreign Application Priority Data

Aug. 25, 1997 (JP) .................................................. 9-228282

(51) Int. Cl.[7] .................................................. B29D 11/00
(52) U.S. Cl. ........................ 264/1.33; 264/2.5; 264/106; 264/1.36; 264/102; 425/126.1; 425/174.4; 425/810
(58) Field of Search ................................. 264/1.33, 106, 264/107, 205, 1.36, 102; 425/810, 126.1, 127, 175, 174.4

(56) References Cited

U.S. PATENT DOCUMENTS 4,569,806 * 2/1986 Holster ................................. 264/1.33
4,995,799 * 2/1991 Hayashi et al. ..................... 264/1.33

FOREIGN PATENT DOCUMENTS

| 0 440 215 A2 | 8/1991 | (EP) . | |
|---|---|---|---|
| 53-86756 | 7/1978 | (JP) . | |
| 57-087332 | 5/1982 | (JP) . | |
| 57-87332 | 5/1982 | (JP) . | |
| 59-106937 * | 6/1984 | (JP) | .................................. 264/1.33 |
| 1-276449 | 11/1989 | (JP) . | |
| 3-225640 | 10/1991 | (JP) . | |
| 5-62254 | 3/1993 | (JP) . | |

* cited by examiner

*Primary Examiner*—Mathieu D. Vargot
(74) *Attorney, Agent, or Firm*—Harness, Dickey & Pierce, P.L.C.

(57) ABSTRACT

In order to realize a compact construction of an apparatus for producing an optical recording medium while shortening the time required for transporting a mold, there is provided an apparatus for producing an optical recording medium by curing a curable resin (102b) between a substrate (101) and a mold (103), including: a mold fixing mechanism (2) for fixing the mold (103); a transporting mechanism (1) for transporting the substrate (101) to which the curable resin (102b) has been applied to a position where the mold (103) is fixed, and placing the substrate (101) on the mold (103) such that the surface of said substrate to which the curable resin (102b) has been applied faces the mold (103); a resin curing mechanism (3) for curing the curable resin (102b) which has been sandwiched between the mold (103) and the substrate (101) by the action of the transporting mechanism (1); and a separating mechanism (4) for separating the resin (102) that has been cured by said resin curing mechanism (3), together with the substrate (101), from the mold (103).

14 Claims, 4 Drawing Sheets

APPARATUS AND PROCESS FOR PRODUCING OPTICAL RECORDING MEDIUM

TECHNICAL FIELD

The present invention relates to an art suitable for production of an optical recording medium having convex-concave patterns formed in the surface thereof. More particularly, the present invention is intended to provide a production apparatus that enables reduction in the number of steps of a process for producing an optical recording medium by making use of a method known as 2P (photo polymerization) method.

BACKGROUND ART

Hitherto, 2P method has been known as a typical process for producing optical recording media, i.e., optical disks. The 2P method has the steps of preparing a flat plate such as of glass (referred to as a "flat substrate", hereinafter), filling the gap between the flat substrate and a stamper with a photo-curable resin that can be cured by energy of light rays such as ultraviolet rays, and irradiating the resin with ultraviolet rays thereby curing the resin.

An example of such a 2P method is disclosed in Japanese Unexamined Patent Application Publication No. 53-86756. The art disclosed in this patent publication uses a mold which is formed from nickel by electroforming (the term "mold" is used to mean a member equivalent to a stamper, throughout the specification). A pattern is transferred from this mold to a flat substrate made of polymethylmethacrylate, polycarbonate or the like, by means of a resin curable by ultraviolet rays.

In the meantime, Japanese Unexamined Patent Application Publication No. 5-62254 discloses a method which uses a mold made of silicon. In this method, a pattern composed of convexities and concavities is formed in a silicon wafer mold by etching, and this pattern is transferred to a flat substrate by means of a resin curable with ultraviolet rays.

It has been a common practice that, in carrying out these known methods, different steps of each method such as bonding of the ultraviolet-rays-curable resin and the substrate, expose, and separation are performed at different places.

Execution of different steps at different places require transportation of the substrate and the mold which consumed time to impair the efficiency of production. Unfortunately, however, the above-mentioned two patent publications fail to disclose any practical form of production apparatus which would enable efficient production.

Two types of approaches are conceivable towards a through process for producing optical disks by using 2P method: one is to produce the disks by moving the mold, while the other is to keep the mold stationed during the production of the disks. Considering that the mold is a precisely-finished part to require a considerable time for transportation, it is considered to be a better policy that the production apparatus is designed to keep the mold stationary.

SUMMARY OF THE INVENTION

Accordingly, it is a first object of the present invention to provide a compact apparatus for producing an optical recording medium, in which a mold is kept fixed so as to eliminate the necessity for any mold transporting mechanism, thus saving the time that has hitherto been required for transporting the mold.

It is a second object of the present invention to provide a compact production apparatus for producing an optical recording medium, in which a substrate on which curable resin has been applied is transported to the position of a mold which is fixed, thus saving the time that has hitherto been required for transporting the mold.

It is a third object of the present invention to provide an apparatus for efficiently producing an optical recording medium, wherein a mold is kept fixed so as to reduce the number of process steps through elimination of steps for clamping and unclamping the mold that have hitherto been necessary.

It is a fourth object of the present invention to provide a compact apparatus for producing an optical recording medium, in which a curing mechanism is transported to the position of a mold that is fixed, thus eliminating the necessity for any mechanism for transporting the mold and saving the time that has hitherto been required for transporting the mold.

It is a fifth object of the present invention to provide a compact apparatus for producing an optical medium, in which a substrate is separated from a mold while the mold is kept fixed, thus eliminating the necessity for any mechanism for transporting the mold and saving the time that has hitherto been required for transporting the mold.

To achieve the first object, there is provided an apparatus for producing an optical recording medium by curing a curable resin between a substrate and a mold, comprising: a mold fixing mechanism for fixing the mold; a transporting mechanism for transporting the substrate to which the curable resin has been applied to a position where the mold is fixed, and placing the substrate on the mold such that the surface of the substrate to which the curable resin has been applied faces the mold; a resin curing mechanism for curing the curable resin which has been sandwiched between the mold and the substrate by the action of the transporting mechanism; and a separating mechanism for separating the resin that has been cured by the resin curing mechanism, together with the substrate, from the mold.

According to this invention, since the mold is fixed and kept stationary, the time which otherwise would be required can be eliminated.

The mold may be made of a metal or other material such as silicon or quartz. The curable resin may be a photo-curable resin or a thermosetting resin. The resin curing mechanism may be of the type that has a function to irradiate the curable resin with light rays or a function for applying heat to the curable resin.

In order to achieve the second object, the apparatus may further comprise a resin applying mechanism for applying the curable resin to the surface of the substrate.

In order to achieve the fifth object, the resin applying mechanism applies the curable resin so as to leave part of the surface of the substrate without being coated with the curable resin.

The presence of a region devoid of the curable resin permits easy separation of the substrate after the adhesion of the cured resin thereto.

To achieve the third object, the mold fixing mechanism may further include: a hermetic vessel having an opening adapted to be covered and hermetically closed by the transporting mechanism and having a bottom adapted for carrying the mold; and a vacuum pump for evacuating the interior of the hermetic vessel.

In accordance with this arrangement, the hermetic vessel is hermetically closed by the transporting mechanism, and air is sucked from the closed hermetic vessel, thereby preventing inclusion of voids in the curable resin. The pressure inside the vessel is then recovered. The vacuum pump is connected to the hermetic vessel through a fixed pipe, whereby the pressure reduction is quickly performed.

In order to achieve the fourth object, a photo-curable resin may be used as the curable resin. In such a case, the resin curing mechanism includes an illuminating device for irradiating the photo-curable resin to cure the photo-curable resin, and an illumination shifting mechanism for shifting the illuminating device to a position near the mold.

This arrangement permits the mold to be kept stationary, since the curing mechanism is brought to the position where the mold is disposed.

In order to achieve the fifth object, the mold has an outside dimension equal to or smaller than that of the substrate, and the separating mechanism includes a gripper that grips part of the substrate so as to separate the cured resin together with the substrate from the mold.

With this arrangement, the cured resin can easily be separated from the mold together with the substrate, because the substrate can be gripped at a portion thereof.

In order to achieve the first object, the present invention also provides a method for producing an optical recording medium by curing a curable resin between a substrate and a mold, comprising the a resin applying step in which the curable resin is applied to a surface of the substrate; a transporting step for transporting the substrate to which the curable resin has been applied to a position where a mold is fixed, and placing the substrate on the mold such that the surface of the substrate to which the curable resin has been applied faces the mold; a resin curing step for curing the curable resin which has been sandwiched between the mold and the substrate after the transporting step; and a separating step for separating the resin that has been cured by the resin curing mechanism, together with the substrate, from the mold.

According to the invention, an apparatus for producing an optical recording medium is provided, wherein a mold is kept fixed so as to eliminate the necessity for any mold transporting mechanism, thus saving the time that has hitherto been required for transporting the mold, while realizing a compact construction of the apparatus.

A production apparatus for producing an optical recording medium is also provided in which a substrate on which curable resin has been applied is transported to the position of a mold which is fixed, thus saving the time that has hitherto been required for transporting the mold, while realizing a compact construction of the apparatus.

According to the invention, there is also provided an apparatus for efficiently producing an optical recording medium, wherein a mold is kept fixed by the mold fixing mechanism so as to reduce the number of process steps through elimination of steps for clamping and unclamping the mold that have hitherto been necessary.

According to the invention, there is provided also an apparatus for producing an optical recording medium, in which a curing mechanism is transported to the position of a mold that is fixed, thus eliminating the necessity for any mechanism for transporting the mold and saving the time that has hitherto been required for transporting the mold, while realizing a compact construction of the apparatus.

According to the invention, there is also provided an apparatus for producing an optical medium, in which a substrate is separated from a mold while the mold is kept fixed, thus eliminating the necessity for any mechanism for transporting the mold and saving the time that has hitherto been required for transporting the mold, while achieving a compact construction of the apparatus.

BEST MODE FOR CARRYING OUT THE INVENTION

A referred embodiment of the present invention will be described in detail with reference to the accompanying drawings.

Apparatus for Producing Optical Disks

Figure 1:
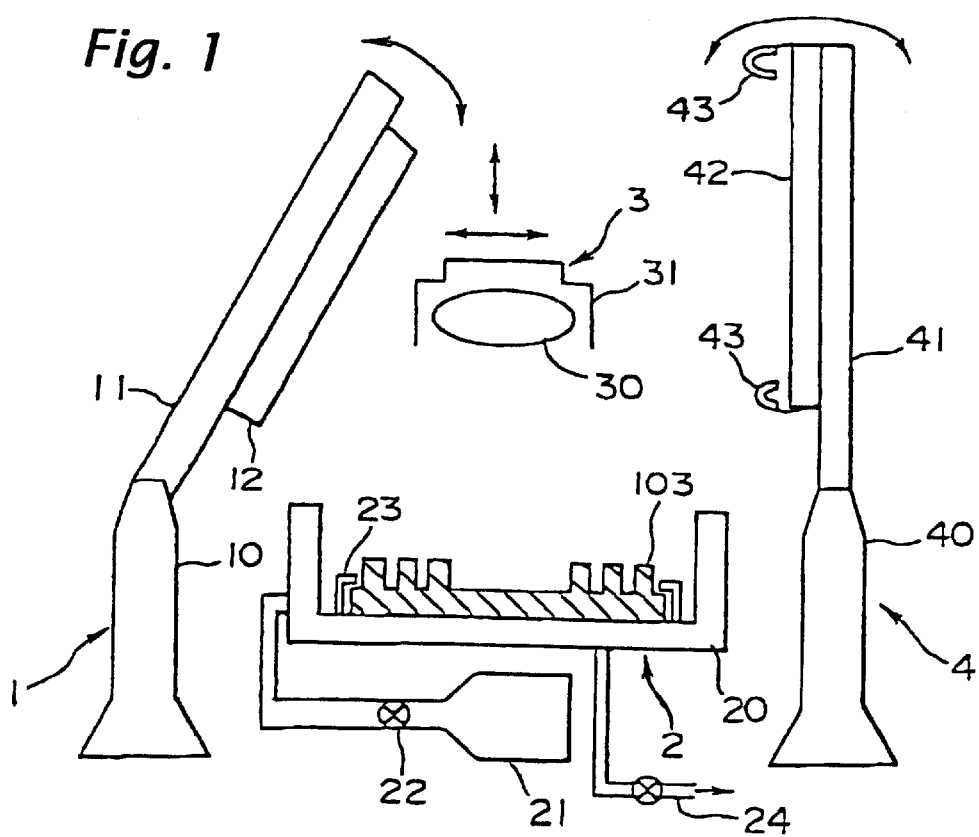
FIG. 1 is an illustration of the construction of an optical disk producing apparatus embodying the present invention.
Figure 3:
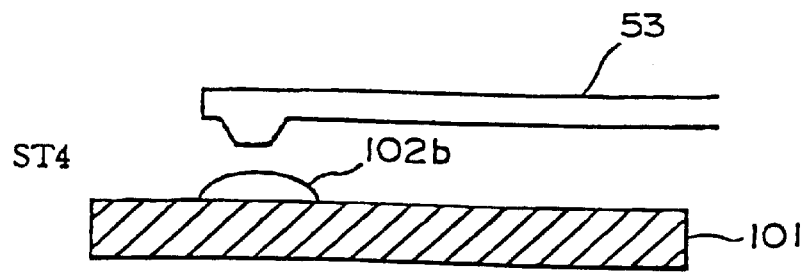
FIG. 3 is an illustration of a step for applying a resin, in an embodiment of the present invention.

The production apparatus of this embodiment is intended for use in the production of optical recording medium, e.g., optical disks. As will be seen from FIGS. 1 and 6, this apparatus has a transporting mechanism 1, a mold fixing mechanism 2, a curing mechanism 3 and a separating mechanism 4. A dispenser 53 as shown in FIG. 3, serving as a resin application mechanism, may be disposed beside the apparatus.

Figure 2:
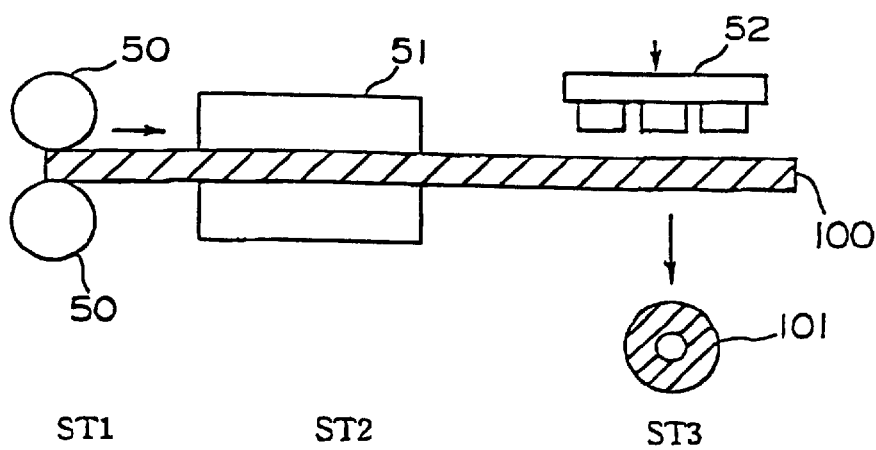
FIG. 2 is an illustration of the construction of a substrate production apparatus in accordance with the present invention.
Figure 7:
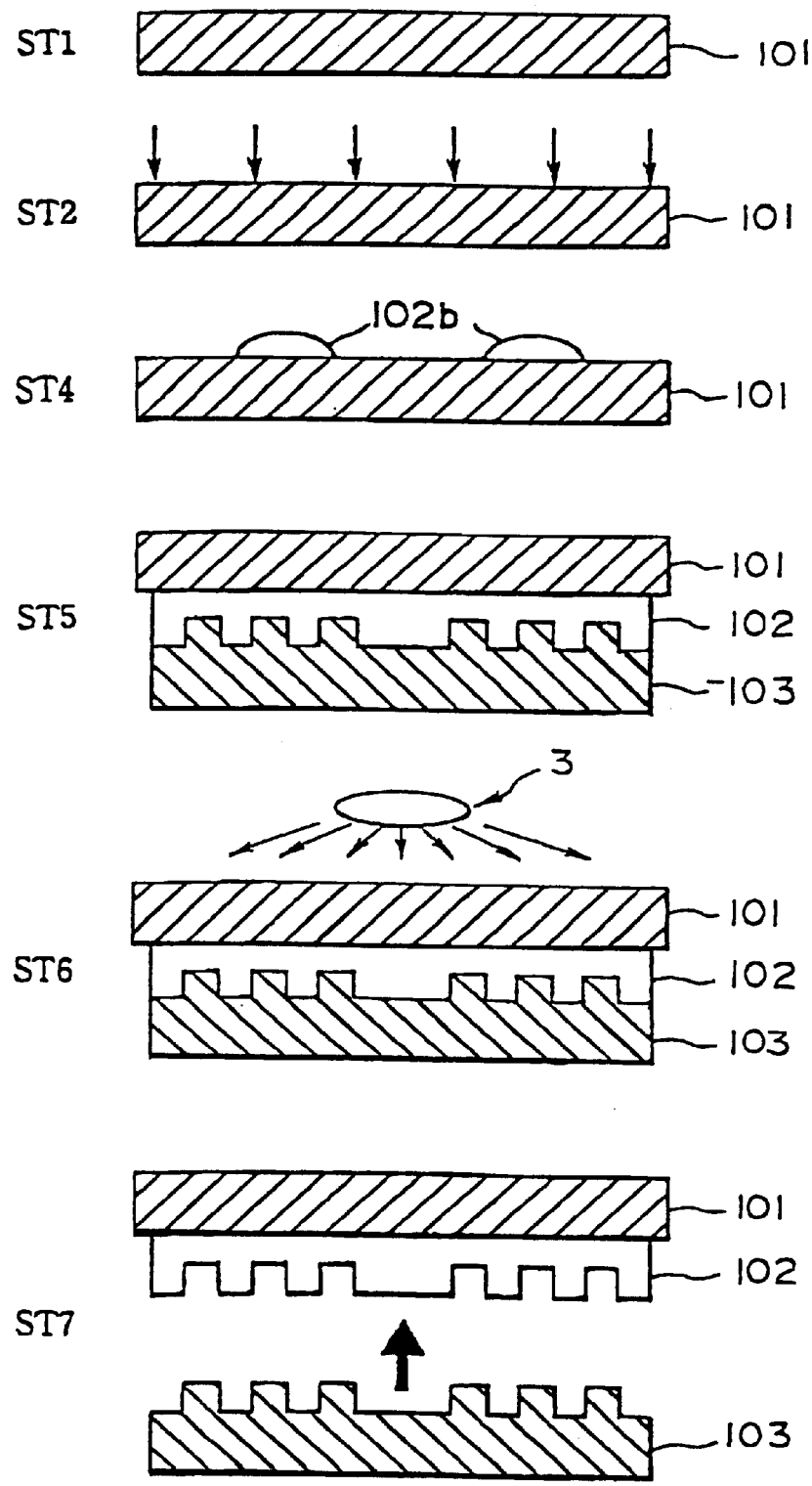
FIG. 7 shows sectional views illustrative of different steps of a process.

The transporting mechanism 1 includes a base member 10, an arm 11 swingably held on the base member 10, and a mold holder 12 that releasably holds a substrate 101 (see FIGS. 2 and 7). The transporting mechanism 1 is constructed such that the mold holder 12 when brought to a position above the mold holding mechanism 2 covers a mold 103 and hermetically seals an opening 20 of a hermetic vessel 20.

The mold fixing mechanism 2 includes the above-mentioned hermetic vessel 20 on the bottom of which the mold 103 is to be placed, a vacuum pump for inducing air from a port formed in the hermetic vessel 20, a valve 22, a fixing member 23 for fixing the mold 23 to the bottom of the mold fixing mechanism 2, and an evacuation system 24 which serves to hold the mold so as to prevent the mold from warping during separation of an optical disk.

The curing mechanism 3 includes a lamp 30 for emitting light rays, a reflector 31 for reflecting light rays towards the mold, and a lamp shifting mechanism that moves the lamp 30 to a desired position around the mold fixing mechanism 2.

The separating mechanism 4 includes a base member 40, an arm 41 swingably held on the base member 40, a holder 42 for releasably holding the substrate 101 (see FIGS. 2 and 7), and a gripper 43 for gripping ends of a substrate 101 when the arm 41 has been brought to a position above the substrate 101 that has been adhered by means of a cured resin. The separating mechanism is so positioned that the holder 42 when brought to a position above the mold fixing mechanism 2 covers the mold 103.

The mold 103 has a contour which is almost the same as that of an optical disk to be produced. It is, however, preferred that the mold 103 is fabricated to have a dimension slightly smaller than that of the optical disk (1 mm or so smaller that the optical disk in terms of radius). Such a dimension facilitates gripping of the ends of the substrate by the gripper 43 of the separating mechanism 4 in the separating step.

In this production apparatus, the transporting mechanism 1 and the separating mechanism 4 are alternately driven. The arrangement is such that during the operation of either the transporting mechanism 1 or the separating mechanism 4 the curing mechanism is stationed at a position where it does not hamper the operation of the arm of the transporting mechanism 1 or the separating mechanism 4.

In the described arrangement, the mold 103 is fixed, and the transporting mechanism 1 and the separating mechanism 4 which are arranged to oppose each other can bring the substrate into and out of the mold fixing mechanism 2 by means of the arm, whereby the mechanism for transporting the mold can be eliminated. During adhesion, the vacuum pump 21 is activated to avoid inclusion of voids in the curable resin. Evacuation by the vacuum pump 21 can quickly be performed because the vacuum pump 21 is fixedly connected to the mold fixing mechanism 2.

Once the mold is held in the mold fixing mechanism 2, the mold is continuously sucked and held by the vacuum produced by the vacuum pump 21. Repetition of sucking and releasing, that have been hitherto necessary for shifting the mold, is therefore dispensed with.

Process of Making Substrate

FIG. 2 shows the construction of an apparatus used for making the substrate. As will be seen from this Figure, the substrate making apparatus has an extrusion molding machine 50, a pretreatment device 51 and a punching device 52.

ST1 (forming step: see FIGS. 2 and 7)

The forming step begins with an extrusion step in which a thermoplastic resin that has been heated, pressed and fluidized in a kneader is supplied into the extrusion molding machine 50. The extrusion molding machine continuously extrudes the resin through a die, so as to form a sheet-like resin plate 100 of a substantially uniform thickness. The forming of the resin into the flat resin plate 100 may be effected by causing the extruded resin to pass through a gap between flat plates instead of a nip between rollers used in the illustrated arrangement. In this embodiment, thermoplastic polyolefin-type polymer is used as the aforesaid resin. Polyolefin polymer exhibits small optical anisotropy and, hence, is an excellent material of optical recording medium.

Step ST2 (pretreatment step: FIGS. 2 and 7)

In the pretreatment step, the extruded resin plate 100 is pretreated by the pretreatment device 51. The term "pretreatment" is used to mean a treatment for activating the surface of the substrate by the effect of an atmospheric plasma, corona discharge, plasma etching in vacuum, or the like. This pretreatment may be conducted after a punching step (ST3).

It is preferred that pressure is applied by a press to the resin plate 100 prior or subsequent to the pretreatment, so as to change the properties of the resin plate 100. Such a pressing serves to achieve higher degree of uniformity of the thickness thus moderately flattening the resin plate 100, while improving optical characteristics such as birefringence, as well as mechanical properties such as slanting strain, tilt, and so forth.

ST3 (punching step: see FIG. 2)

A disk-shaped substrate 101 conforming with the shape of an optical disk is punched out from the resin plate 100, by means of a punching device 52.

Process for Adhering Photo-curable Resin

Resin Applying step (ST4: see FIGS. 3 and 7)

Molten and fluidized photo-polymerizable resin 102*b* is applied to the substrate 101 by means of a dispenser 53. The quantity of the resin applied should be large enough to form an information recording surface layer on each optical disk. Preferably, the photo-curable resin 102*b* is applied to a central region of the substrate 101 so as to expose the peripheral region which does not contributes to recording of information. (see FIG. 5)

Application of the photo-curable resin 102*b* may be conducted before or after the substrate 101 is held by the holder 12 of the transporting mechanism 1.

Figure 4:
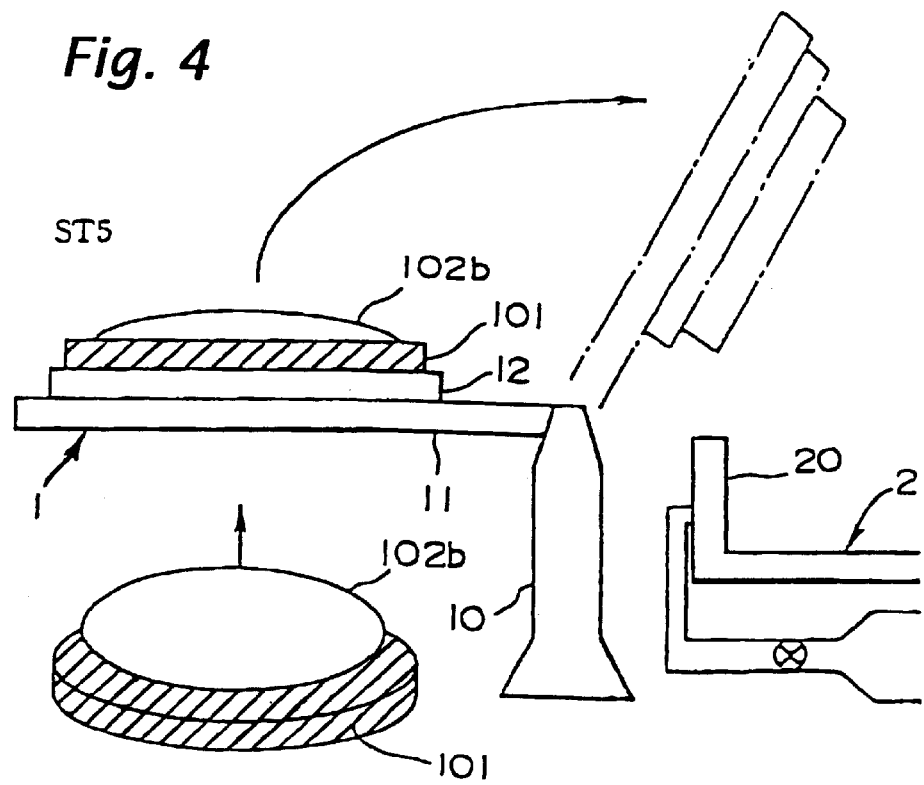
FIG. 4 is an illustration of a transporting step.

Transporting step (ST5: see FIGS. 4 and 7)

The substrate 101 with the photo-curable resin 102*b* applied thereto is held by the holder 12 on the arm 11. The arm 11 is swung as indicated by arrow in FIG. 4, whereby the photo-curable resin 102*b* is pressed against the mold 103. As a result, the convex-concave pattern on the mold 103 is transferred to the photo-curable resin 102*b*. In this state, the holder 12 hermetically closes the opening of the hermetic vessel 20. The valve 22 is then opened and the vacuum pump 21 is started, thereby reducing pressure inside the hermetic vessel 20. Since the placement of the substrate 101 on the mold 103 is executed under reduced pressure, it is possible to avoid generation of voids in the photo-curable resin.

Then, after the substrate 101 is placed on the mold 103, the valve 22 is opened at once to recover normal pressure. This step serves to enable uniform pressurizing by atmospheric pressure, i.e., uniform pressing of the photo-curable resin on the substrate 101. Consequently, the mold 103 is pressed against the bottom of the hermetic vessel 20, thereby fixing the mold.

Figure 5:
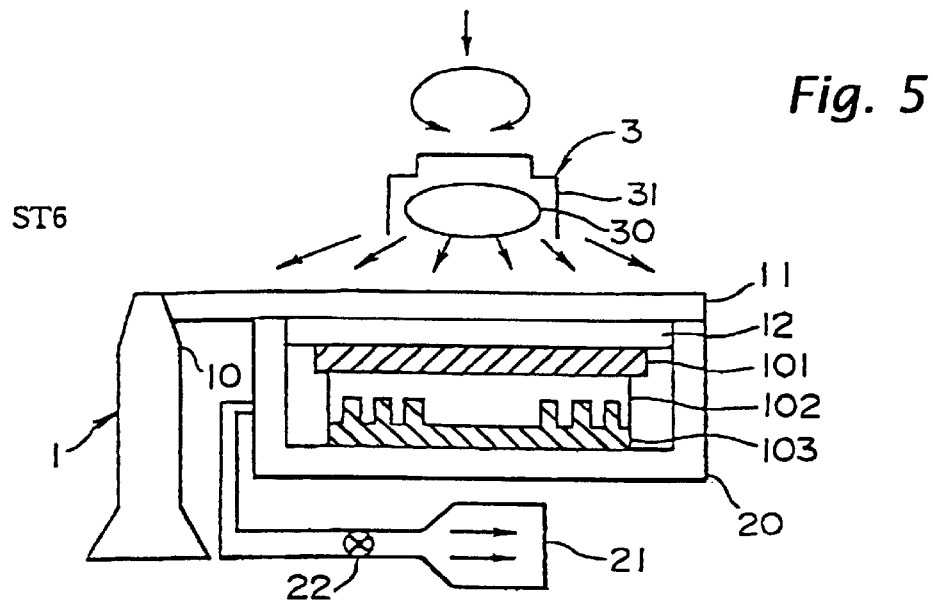
FIG. 5 is an illustration of a curing step.
Figure 6:
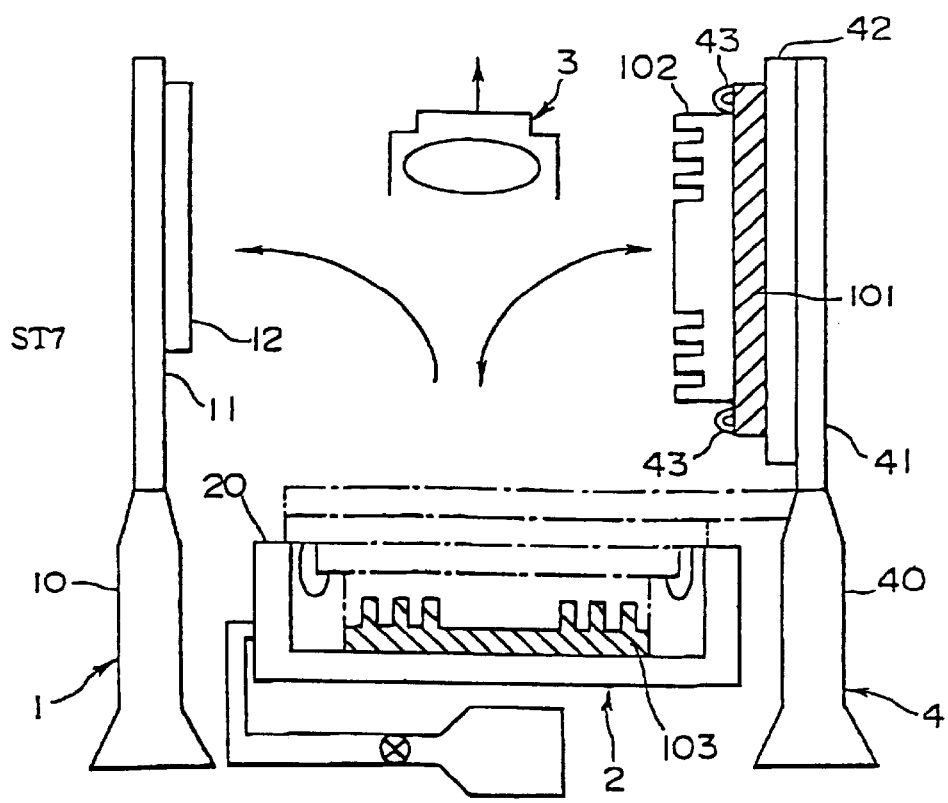
FIG. 6 is an illustration of a separating step.

Curing step (ST6: see FIGS. 5 and 6)

In the curing step, exposure is performed by the curing mechanism 3. More specifically, while the photo-curable resin 102*b* on the substrate 101 is pressed against the mold 103 by the action of the transporting mechanism 1, the curing mechanism 3 is moved towards the mold fixing mechanism 2 to start irradiation by the lamp 30. The holder 12 is made of a material that passes the light rays applied thereto from the back or upper side, so that the light rays from the lamp 30 are transmitted to reach the photo-curable resin 102*b*. The light rays serve to cure the photo-curable resin, whereby a photo-cured resin layer 102 is formed. As a result of the curing, the photo-cured resin layer 102 is adhered to the substrate 101.

Separating step (ST7: FIGS. 6 and 7)

In the separating step, the curing mechanism 3 is raised first. Then, the transporting mechanism 1 opens the substrate 101, and resets the arm 11 to the starting position. Then, the separating mechanism 4 is moved to a position above the mold fixing mechanism 2 and grips the substrate 101. If the mold 103 has been formed to have an outside dimension smaller than that of the substrate 101, the substrate 101 is gripped by the gripper 43 at peripheral portions devoid of the photo-cured resin layer 102, whereby the substrate 101 is firmly fixed to the holder 42. If the outside dimension of the substrate 101 is equal to or smaller than that of the mold, the separation is performed by clamping the substrate at its outer peripheral edge. The arm 41 is then moved to the starting position, so that the substrate 101 is separated from the mold 103, together with the photo-cured resin layer 102.

Although in the described process the photo-curable resin is applied to the substrate, this is not exclusive and the resin may be applied to the mold instead of being applied to the substrate.

As a result of execution of these steps, a green optical disk is obtained having the substrate 101 mainly composed of the polyolefin polymer and the photo-cured resin layer 102 having concave-convex pattern (pits or grooves) in accordance with desired information.

For producing a read-only optical disk, a reflective film and protective film are formed in the described sequence on the photo-cured resin layer 102 of the green disk. For producing a rewritable magneto-optical disk that permits both recording and reproduction, a protective film, a magneto-optical recording film and a reflective film are formed in the mentioned order on the photo-cured resin layer 102.

Although production of an optical recording medium having a disk-like form, i.e., optical disk, has been described, it is to be understood that the recording medium can also have any other desired form such as a rectangular form. Further, the recording medium need not always be flat but may be curved out of a plane.

Advantages of the Invention

In the described embodiment, the transporting mechanism, curing mechanism and the separating mechanism are arranged around the mold fixing mechanism in which the mold is to be fixed. This arrangement eliminates the necessity for any mechanism which hitherto has been necessarily used for the purpose of transporting the mold, whereby the dimensions of the whole apparatus is remarkably reduced.

To explain in more detail, when a mold is made of silicon which permits formation of microfine concave-convex pattern, a large-scale transporting mechanism is required in order that the mold is conveyed at a low speed so as not to be damaged by mechanical impact. In contrast, the described embodiment eliminates the necessity for transporting the mold, thus shortening the overall process time and reducing the number of steps of the whole process.

It will be understood that transportation of the mold when executed requires repetition of operation for fixing the mold in the hermetic vessel, taking the labor of reducing the pressure in the hermetic vessel and recovering the atmospheric pressure that serves to press and fix the mold. Such a fixing operation is required only once in the described embodiment in which the mold is fixed without being moved. This also contributes to the reduction in the number of steps as compared with the case where the mold is transported.

In addition, in the described embodiment, mold made of a fragile material such as silicon can safely be used because the mold is not transported.

It is also to be understood that a peripheral region of the substrate is available as a region to be gripped by the gripper of the separating mechanism, because the mold has an outside dimension smaller than that of the substrate. Since the substrate is firmly gripped at suitable potions thereof, it is possible to exert a large force for separating the substrate from the mold.

Modifications

The described embodiment is not exclusive and may be changed or modified in various forms.

For instance, the dispenser which is separately provided for the purpose of executing the resin applying step may be disposed within the range of movement of the transporting mechanism. Such an arrangement enables a series of operations to be continuously performed, including the application of the photo-curable resin onto the substrate by the dispenser, and the placement of the resin-coated substrate on the mold, thus enabling a further reduction in the number of process steps.

The arrangement also may be such that a dispenser is used for applying the photo-curable resin directly to the mold. Such an arrangement eliminates the necessity of the dispenser for applying the photo-curable resin to the substrate, thus contributing to further reduction of the process time Further, a thermosetting resin may be used as the curable resin in combination with a heating mechanism serving as the curing means, in place of the combination of a photo-curable resin and a lamp serving as the curing means that are used in the described embodiment. When such a thermosetting resin is used, the heating mechanism is disposed so as to heat and thermally set the resin within the hermetic vessel. Such an arrangement permits production of optical recording medium with a reduced number of steps, even with the use of a thermosetting resin.

Although in the described embodiment the optical recording medium has a disk shape, the medium may have various other suitable forms such as, for example, a rectangular form as is the case of an IC card.

What is claimed is:

1. An apparatus for producing an optical recording medium by curing a curable resin between a substrate and a mold, comprising:
   a mold fixing mechanism for fixing said mold;
   a transporting mechanism for transporting said substrate having said curable resin deposited to a position where said mold is fixed, and placing said substrate on said mold such that a surface of said substrate to which said curable resin has been applied faces said mold wherein, the transporting mechanism hermetically closes said mold fixing mechanism upon placing said substrate on said mold;
   a resin curing mechanism for curing said curable resin which has been sandwiched between said mold and said substrate by of said transporting mechanism; and
   a separating mechanism for separating the resin that has been cured by said resin curing mechanism, together with said substrate, from said mold.

2. An apparatus for producing an optical recording medium according to claim 1, further comprising a resin applying mechanism for applying said curable resin to said surface of said substrate.

3. An apparatus for producing an optical recording medium according to claim 2, wherein said resin applying mechanism applies said curable resin to said surface of said substrate, so as to leave part of said surface exposed.

4. An apparatus for producing an optical medium according to claim 1, wherein said mold fixing mechanism includes: a hermetic vessel having an opening adapted to be covered and hermetically closed by said transporting mechanism and having a bottom adapted for carrying said mold; and a vacuum pump for evacuating an interior of said hermetic vessel.

5. An apparatus for producing an optical recording medium according to claim 1, wherein said curable resin is a photo-curable resin, and wherein said resin curing mechanism includes an illuminating device for irradiating said photo-curable resin to cure said photo-curable resin, and an illumination shifting mechanism for shifting the illuminating device to a position near said mold.

6. An apparatus for producing an optical recording medium according to claim 1, wherein said mold has an outside dimension equal to or smaller than that of said substrate, and wherein said separating mechanism includes a gripper that grips part of said substrate so as to separate the cured resin together with said substrate from said mold.

7. A method for producing an optical recording medium by curing a curable resin between a substrate and a mold, comprising:

a resin applying step in which said curable resin is applied to a surface of said substrate;

a transporting step for transporting said substrate to which said curable resin has been applied to a position where a mold is fixed, and placing said substrate on said mold such that the surface of said substrate to which said curable resin has been applied faces said mold;

a sealing step for hermetically sealing an opening in said mold upon placing said substrate on said mold;

a resin curing step for curing said curable resin which has been sandwiched between said mold and said substrate after said transporting step; and a separating step for separating the resin that has been cured by said resin curing mechanism, together with said substrate, from said mold.

8. A method of producing an optical recording medium comprising:

providing a substrate;

applying a curable resin to a surface of said substrate;

transporting said substrate to a fixed position mold;

placing said substrate on said mold such that said curable resin is sandwiched therebetween;

hermetically sealing an opening in said mold upon placing said substrate on said mold;

curing said curable resin; and separating said substrate and said curable resin from said mold.

9. The method of claim 8 wherein said step of applying said curable resin to said substrate further comprises leaving a portion of said surface devoid of said curable resin.

10. The method of claim 9 wherein said step of separating said substrate from said mold further comprises gripping said portion of said surface.

11. The method of claim 8 wherein said step of hermetically sealing said opening in said mold is followed by a step of reducing a pressure within an interior of said mold proximate said curable resin.

12. The method of claim 8 wherein said step of curing said curable resin further comprises photo-curing.

13. The method of claim 8 further comprising reducing a pressure within a volume between said substrate and said mold proximate said curable resin after said step of placing said substrate on said mold so as to avoid generation of voids in said curable resin.

14. The method of claim 13 further comprising returning said pressure within said volume to normal after said step of reducing said pressure to enable uniform pressing of said curable resin.

* * * * *

UNITED STATES PATENT AND TRADEMARK OFFICE
CERTIFICATE OF CORRECTION

PATENT NO. : 6,280,661 B1  
DATED : August 28, 2001  
INVENTOR(S) : Atsushi Takakuwa, Takao Nishikawa, Satoshi Nebashi Page 1 of 1

It is certified that error appears in the above-identified patent and that said Letters Patent is hereby corrected as shown below:

Column 4,  
Line 24, "referred" should be -- preferred --  
Line 47, "mold 23" should be -- mold 103 --

Column 5,  
Line 2, delete "that" and substitute -- than -- therefor

Column 6,  
Line 9, delete "contributes" and substitute -- contribute -- therefor Column 7,  
Line 53, delete "potions" and substitute -- positions --

Column 8,  
Line 34, delete "of"

Signed and Sealed this

Twenty-sixth Day of March, 2002

Attest:

*Attesting Officer*

JAMES E. ROGAN  
*Director of the United States Patent and Trademark Office*